United States Patent [19]

Miller, Jr. et al.

[11] 3,772,999

[45] Nov. 20, 1973

[54] FLUIDIZED BED APPARATUS

[75] Inventors: Clarence S. Miller, Jr., Kennett Square, Pa.; Herbert Kenneth Staffin; Robert Staffin, both of Colonia, N.J.

[73] Assignee: AWT Systems Inc., Wilmington, Del.

[22] Filed: Mar. 6, 1972

[21] Appl. No.: 231,981

[52] U.S. Cl. .............................. 110/8 R, 110/28 J
[51] Int. Cl. ................................ F23g 5/00
[58] Field of Search ............... 110/8 R, 28 J; 34/57 R, 57 A

[56] References Cited
UNITED STATES PATENTS

| | | | |
|---|---|---|---|
| 3,589,313 | 6/1971 | Smith et al. | 110/8 |
| 3,397,657 | 8/1968 | Tada | 110/8 |
| 3,417,978 | 12/1968 | Suzukawa et al. | 34/57 |
| 3,361,539 | 1/1968 | Pyzel | 34/57 X |
| 3,399,637 | 9/1968 | Hirschfield | 110/8 |

*Primary Examiner*—Kenneth W. Sprague
*Attorney*—Finnegan, Henderson & Farabow

[57] ABSTRACT

An improved fluidized bed apparatus for combusting or reacting mixtures of combustible and non-combustible waste matter is disclosed. The improvement resides in a distributor plate having sides sloping toward the bottom of the apparatus and having an inlet for solid feed in the side of the distributor plate. A pipe extends downwardly from the base of the distributor plate and functions to capture non-combustibles in the solid feed. A lock is provided which permits non-combustibles to be removed from the apparatus without interruption of operation.

6 Claims, 3 Drawing Figures

FLUIDIZED BED APPARATUS

This invention relates to an improved fluidized bed apparatus, said improvement residing in an improved distributor plate arrangement which permits removal of unreacted solids from the apparatus without interruption in operation.

The use of fluidized bed reactors for combusting or reacting solid materials, liquids, slurries and sludges is well known. Heretofore the use of a fluidized bed reactor, for the handling of municipal refuse, presented two major difficulties. First, the material to be reacted has been fed to the reactor bed through a side wall or deposited on the top of the bed. Both procedures failed to provide efficient dispersion of the charge throughout the bed. Specifically, side feed will normally leave the material at the reactor wall wherefrom its tendency is to move up around the outside of the reactor leaving the central region of the bed without material to be reacted. Where an attempt has been made to remedy this shortcoming by utilizing several, peripherally-spaced inlets, distribution is still at the outer part of the bed, but delivered there at more than one point. When the material to be reacted is deposited from the top of the reactor, distribution is still far from satisfactory because the reactable components are usually less dense and float on top of the bed. Second, non-reacting materials in the feed, such as metal or glass in refuse, accumulate in the bottom of the reactor and eventually force shut-down and clean-out of the reactor.

The present invention is an improved fluidized bed apparatus for overcoming the above stated disadvantages. The solid refuse charge is delivered to the bottom of the reactor by force feed and desirably to a distributor plate near the bottom of the reactor in which the side walls of the plate slope downwardly from the periphery of the reactor toward the center thereof, whereby the charge is distributed over a comparatively large portion of the distribution plate. The refuse charge is moved upwardly in the agitated bed by the gas pressure employed for fluidization, while being reacted or combusted. The heavier solid components of the charge, such as metal and glass, move downward gravitationally which movement is aided by the slope of the distributor plate side walls. These solids are removed by an arrangement in the nature of a lock so constituted that removal of these heavier solid components may proceed without shutting down the reactor.

The improved fluidized bed apparatus of this invention is more fully described in the drawings which follow. In the drawings, like numbers refer to like parts where applicable.

DESCRIPTION OF THE PREFERRED EMBODIMENT

Figure 1:
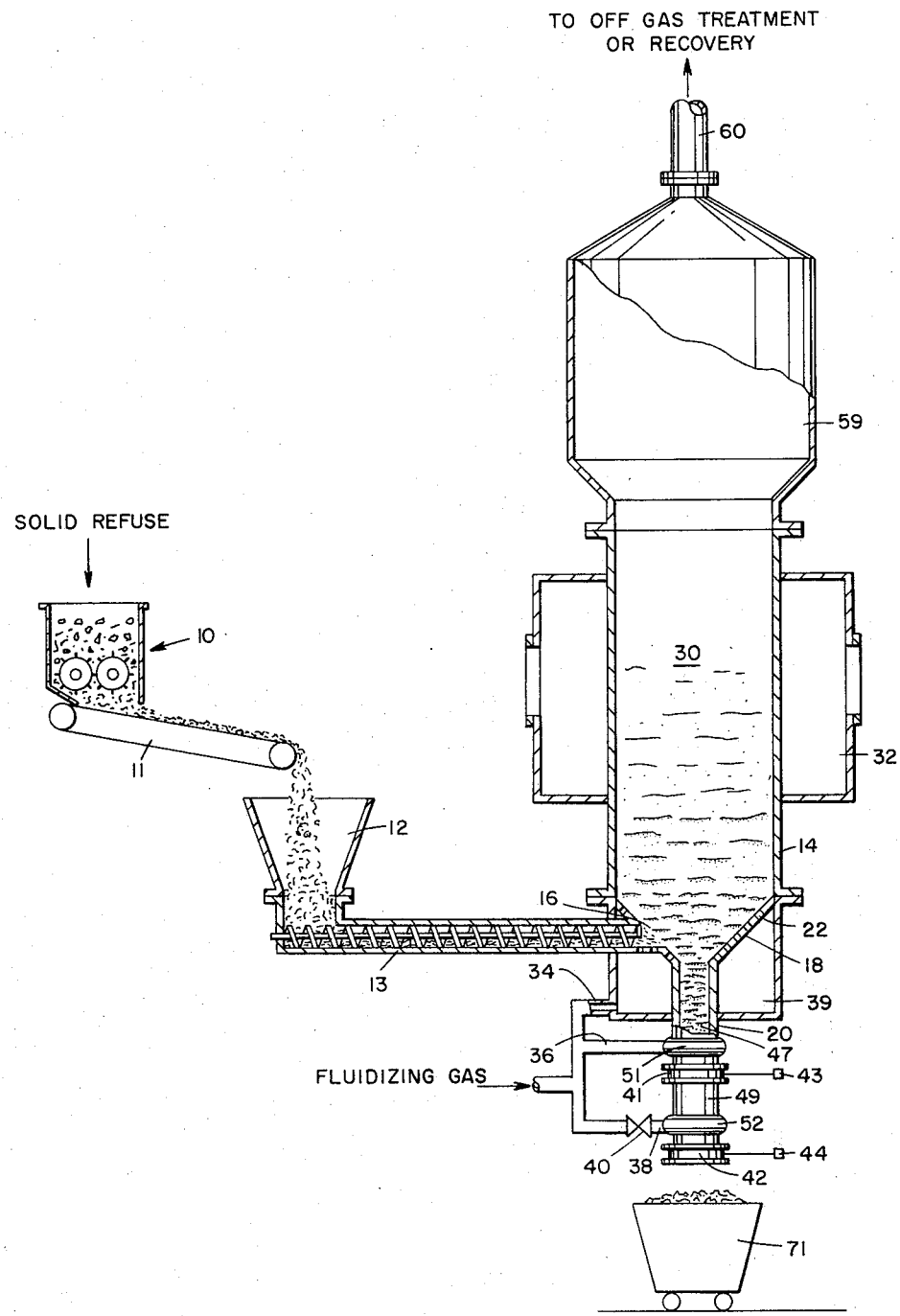
FIG. 1 is a schematic view illustrating a basic arrangement of the improved fluidized bed apparatus of this invention.

In FIG. 1 a shredder 10 of any commercially available type is arranged to receive raw refuse and shred the larger pieces contained therein into fragments, say 2 inches in average dimensions. Such fragments are capable of being fed by a screw feeder to the reactor vessel, and of being passed through the lock, to be described hereinafter, when being discharged from the reactor. Following shredding the fragments and other refuse are delivered via a conveyor 11 to a hopper 12 and then into a force feeder 13, in this case a screw conveyor. Obviously, the hopper 12 and conveyor 11 may be dispensed with and the charge delivered directly from the shredder to the feeder 13. Furthermore, any other means may be employed to break up the non-combustible pieces.

Figure 3:
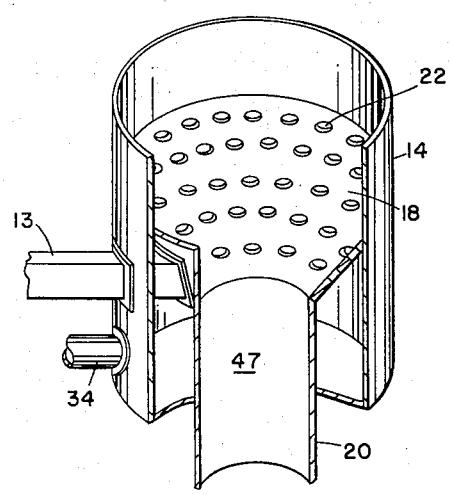
FIG. 3 is a perspective view illustrating the sloping side walls of the distributor plate of this invention.

The charge is delivered to a reactor 14 through an opening 16 in the side walls defining distributor plate 18 which forms the floor of the reactor 14. The distributor plate side walls 18 slope downwardly from the periphery of the reactor 14 toward the center thereof to facilitate gravity separation of the metal, glass, and other non-combustible fragments for delivery to an outlet pipe 20. Distributor plate 18 has a multiplicity of fluidizing gas passages 22 therethrough. The sloping nature of the side walls of distributor plate 18 is also shown in FIG. 3.

As will be understood, the fluidized bed proper 30 comprises a refractory, particulate material, e.g. 20 mesh sand. Heating means 32 may surround the vessel 14 to preheat the gas being fed to the bed or the heating means may be interiorly of the vessel. The fluidizing gas is supplied to a manifold having several branches 34, 36 and 38. Manifold branch 38 is provided with a valve 40. Manifold branch 34 enters a plenum chamber 39 below the distributor plate 18. The plenum chamber 39 distributes the gas uniformly over the full cross sectional extent of the lower bed. Conveyor 13 passes through the plenum chamber 39 below the top of the distributor plate 18 and enters the bed through the opening near the midpoint of the side walls of the distributor plate 18. In the case of large diameter vessels, multiple points of feed may be availed of, these being so sized and spaced as to result in optimum dispersion of the charge. The distributor plate 18 merges into outlet pipe 20, which is interrupted by two gate valves 41 and 42, each having a power means 43 and 44 for actuation. Thus, outlet pipe 20 and valve 41 may be regarded as defining a lower portion of the lower bed 22, viz. a capture bed 47. The pipe 20 and the valves 41 and 42 define a lock. The interior 49 of the lock between valves 41 and 42 is also referred to as the discharge zone of the reactor. Other types of valving providing an inlet and an outlet for the lock can be substituted for the valving illustrated.

Figure 2:
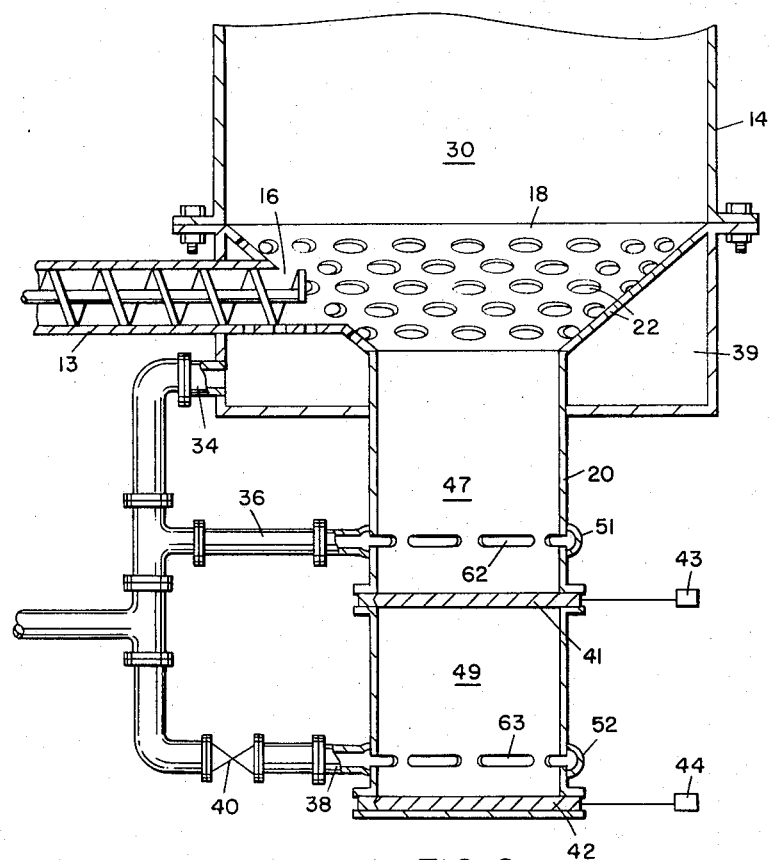
FIG. 2 is a schematic view illustrating the reactor and associated means for charging the bed and removing the heavier non-combustible components from the reactor.

In order to react material which is not picked up by, and reacted in the main portion of the fluidized bed, fluidizing gas is delivered through the branches 36 and 38 to circular chambers 51 and 52 surrounding the outlet pipe 20. This is clearly shown in FIG. 2. These chambers are slotted at 62 and 63 to provide communication with the zones 47 and 49. The chamber 59 at the top of the reactor receives the products of reaction which are taken off by a conduit 60 for further treatment, such as purification or recovery and re-use.

OPERATION

In actual operation a shredded refuse feed is delivered by conveyor 13 to the conically shaped distributor plate 18. Fluidizing gas is simultaneously fed into plenum chamber 39 and passes through the gas passages 22 in the distributor plate 18 fluidizing the bed. Products of reaction such as steam and gases are taken off overhead, and the non-reactable materials such as metal or glass move toward and sink into the capture bed 47. This behavior is facilitated by the frusto-conical form of the distributor plate 18 and the turbulence induced by reason of the gas issuing therefrom. After a sensible quantity of non-reactable or non-reacted materials have collected in the capture bed 47, the valve 41 is opened and fluidizing gas is admitted to the discharge zone 49 by opening the valve 40. Thus, reaction is continued in these zones. Opening of the valve 41 drops the contents of the capture bed 47 into the discharge zone 49, whereupon valves 40 and 41 are closed. Then valve 42 is opened and the non-reacted material, together with residual particles of the bed, are dropped into a hopper truck 71 for removal. The discharge cycle is then repeated as frequently as necessary. Timed actuation of the valves 40, 41 and 42, at intervals determined by observation of the behavior of the reactor over a reasonable period of time is possible.

The fluidized bed apparatus of this invention can be operated as an incinerator with the admission of air to the reactor, it can be operated in the substantial absence of air as a pyrolyzer, or it can be operated with controlled amounts of air added to promote the desired reaction of the solids feed.

What is claimed is:

1. In a fluidized bed apparatus for treating feed comprising a mixture of combustible and non-combustible solids, the improvement comprising:
   a. a reactor distributor plate for supporting a fluidized bed and having fluidizing gas passages therethrough, said distributor plate having side walls sloping downwardly from the periphery of the reactor toward an outlet in the center thereof;
   b. a pipe in communication with the outlet in the bottom of the distributor plate and extending downwardly therefrom forming an outlet pipe for the fluidized bed and defining a capture bed below the fluidized bed; and
   c. means for supplying fluidizing gas to the gas passages in the distributor plate and to said capture bed.

2. The fluidized bed apparatus of claim 1 in which the distributor plate is frusto-conical in shape.

3. The fluidized bed apparatus of claim 1, including an opening in the sloping side wall of the distributor plate through which the feed is delivered to the reactor.

4. The fluidized bed apparatus of claim 1, including a lock in said outlet pipe located below the capture bed and having an entrance side and an exit side, the entrance side of the lock, when open, allowing passage of unreacted materials and bed particles to pass from the capture bed in the pipe to the interior of the lock and there remain while the exit side of the lock is closed and, when said entrance side is closed and said exit side is open, to allow the contents of the lock to be discharged therefrom.

5. The fluidized bed apparatus of claim 4 in which the lock comprises in combination first and second valves spaced apart along said pipe and each adapted to be operated between open and closed positions to permit or interrupt flow through the pipe, the valves and the portion of the pipe between them defining said lock whereby a quantity of unreacted materials and some reactor particles collected above the first valve can, by opening the first valve while the second valve is closed, pass into the lock and, upon closing the first valve and opening the second valve, be discharged from said lock.

6. The fluidized bed apparatus of claim 4, further characterized by means for supplying fluidizing gas to the contents of the lock.

* * * * *